United States Patent [19]  
Curtice et al.

[11] 3,861,468  
[45] Jan. 21, 1975

[54] METHOD FOR STABILIZING INCOMPETENT SAND CONTAINING FORMATIONS

[75] Inventors: Beverly A. Curtice, Portsmouth, Va.; James W. Hughes, Houston, Tex.

[73] Assignee: Texaco Inc., New York, N.Y.

[22] Filed: Dec. 28, 1973

[21] Appl. No.: 429,427

[52] U.S. Cl. .................................. 166/276, 166/293
[51] Int. Cl. ..... E21b 33/13, E21b 43/02, C04b 7/02
[58] Field of Search ............ 166/276, 292, 293–295; 106/90, 97, 98

[56] References Cited
UNITED STATES PATENTS

| | | | |
|---|---|---|---|
| 2,188,767 | 1/1940 | Cannon et al. | 166/293 |
| 2,806,531 | 9/1957 | Morgan et al. | 166/293 |
| 2,878,875 | 3/1959 | Dunlap et al. | 166/293 |
| 3,071,481 | 1/1963 | Beach et al. | 166/293 X |
| 3,389,751 | 6/1968 | Harnsberger | 166/276 |
| 3,646,998 | 3/1972 | Curtice et al. | 166/276 |
| 3,816,148 | 6/1974 | Barthel | 166/293 X |
| R27,271 | 1/1972 | Harnsberger et al. | 166/293 X |

*Primary Examiner*—Stephen J. Novosad
*Attorney, Agent, or Firm*—Thomas H. Whaley; C. G. Ries

[57] ABSTRACT

The present invention relates to an improved method of treating underground formations. More particularly, this invention is directed to an improved method of treating permeable underground unconsolidated sand-containing formations and particularly oil and/or gas-containing unconsolidated sand formations to stabilize the sandy portion thereof and to an improved aqueous carrier fluid for a treating composition useful in the stabilization of such incompetent sand containing underground formations.

10 Claims, No Drawings

METHOD FOR STABILIZING INCOMPETENT SAND CONTAINING FORMATIONS

The recovery of fluids such as, for example, gas and/or oil from underground formations has been troublesome in areas wherein the underground formation is composed of one or more incompetent sand containing layers or zones. The sand particles in the incompetent zone and/or layer tend to move or migrate to the well bore during recovery of the formation fluids from the particular zone and/or layer and frequently the moving sand particles block the passageways leading to the well bore. Plugging or materially impairing the flow of the formation fluids toward the bore hole results in a loss of these fluids to the producer or so decreases the rate of fluid recovery from the well as to cause the well to be shut down because it is economically unattractive to continue to produce therefrom. An additional adverse factor resulting from the movement of the sand particles toward the well bore is that they are often carried along with the formation fluids to the well bore and passed through the pipes, pumps, etc., being used to recover the formation fluids to the surface with resulting damage to the moving parts thereof as the sand particles are very abrasive.

Many attempts have been made heretofore to prevent or decrease the flow of undesirable sand particles in the formation and/or in the production tubing and associated equipment, such as by the placement of sand screens, filters, liners and so forth. These prior attempts have been unsuccessful for a number of reasons among which is that these mechanical devices fail to prevent completely the flow of the formation particles into the production equipment. In addition these devices interfere with various types of completion and workover operations. In recent years, the industry has attempted to avoid the difficulties encountered in the use of mechanical devices by employing various chemical compositions to effect consolidation of the underground incompetent formations. These methods have generally consisted of injecting into the underground formation polymerizable resinous materials which when subsequently polymerized form permeable barriers in the formation to prevent the sand particles from movement therethrough. However, this technique of sand consolidation has not met with wide-spread acceptance because of the inherent difficulties of effecting polymerization of the resinous materials in the formation to a degree sufficient to consolidate these underground formations and yet permitting the unobstructed flow of the desirable formation fluids therethrough. Further, the cost associated with these resin coating methods has been relatively high in comparison with the prior mechanical methods.

It is known from commonly assigned U.S. Pat. No. 3,429,373, issued Feb. 25, 1969, and Reissue U.S. Pat. No. 27,271, dated Jan. 11, 1972, entitled "Method and Composition for Stabilizing Incompetent Oil Containing Formations" to form a slurry of sand, cement and a sufficient amount of a petroleum oil fraction containing an oil wetting agent therein to oil wet the sand and cement particles, suspending the oil wet sand and cement particles in an aqueous carrier medium, injecting the aqueous suspension against the unconsolidated sand formation, contacting the suspension with an aqueous surface active agent solution to water wet the cement particles, permitting the cement to set and form a permeable cement and recovering oil through the cement. The subject matter of this patent is incorporated herein by reference.

In carrying out the practice of the method and composition described in said patent it has been found that certain difficulties have arisen in field use. The major problem encountered was the relative instability of the formed permeable cement barrier in the formation with respect to the compressive strength thereof.

It has now been found that this problem can be overcome by an improved method of preparing the treating composition suspended in the aqueous carrier medium.

Accordingly, by the improved method and composition of the present invention one is able to treat more effectively the underground formation to be stabilized in a rapid and efficient manner.

One object of the present invention is to provide an improved method of treating underground sand-containing formations to stabilize the incompetent formation. An additional object is to provide a fluid-permeable barrier between the formation sand and the well bore to prevent or minimize the flow of unconsolidated sand particles therethru while maximizing the flow of desired fluids and particularly petroleum hydrocarbon therethru. A still further object is to provide an improved novel treating composition for use in stabilizing incompetent sand formations and to a method of placing same to form a permeable cement filter against the incompetent formation.

How these and other objects of the invention are accomplished will become apparent with reference to the accompanying disclosure. In at least one embodiment of the method of this invention at least one of the foregoing objects will be obtained.

It has now been discovered that an improved method of treating an incompetent sand-containing underground formation comprises introducing against said formation a particular treating composition consisting essentially of a hydrocarbon oil wet sand, cement and oil-wetting agent, dispersed or suspended in a conditioned aqueous carrier medium, as hereinafter more fully described, in an amount sufficient to stabilize the formation and then to contact the introduced treating composition with an aqueous solution of a hydrophilic surfactant to penetrate the oil layer about the sand and cement components of the treating composition and to effect setting of the cement to form a fluid-permeable barrier between the formation and the well bore. The resultant formed permeable cement barrier serves to prevent or to materially reduce the flow of the unconsolidated sandy particles therethru while permitting the flow of desirable formation fluids thru the permeable barrier at a substantially unimpaired rate.

In carrying out the improved method of the present invention the treating composition suspended in the conditioned aqueous carrier medium can be pumped down the well bore preferably under sufficient pressure to force the hydrocarbon oil-wetted sand-cement-oil wetting agent admixture against the unconsolidated formation adjacent to or in reasonable proximity to the well bore. When the treating composition is placed against the formation to be consolidated the treating composition then is contacted with an aqueous solution of a hydrophilic surfactant which displaces the oil layer around the sand-cement particles and renders these particles water wet. The cement component of the composition then sets up and hardens. After the cement hardens the well can be equipped for production and the formation fluids can be recovered by passing thru the resulting formed permeable cement barrier into the well bore and recovered therefrom without the formation fluids being contaminated with the presence therein of unconsolidated sand particles.

The improved method of the present invention is particularly adaptable for use in any type of well completion but is generally used in a well wherein casing has been set and which has perforations therein at the desired intervals behind which the unconsolidated formation sands are located. Packers can be initially set above and below the perforated intervals to prevent the treating composition from passing into the nonisolated portions of the well and also to permit buildup of sufficient pressures on the treating composition to force same thru the perforations and against the formation without plugging up the well bore. After the treating composition has been forced through the casing perforations and against the formation and after it has been contacted with the aqueous solution of the hydrophilic surfactant the well is closed in to permit the cement to set and form the permeable cement barrier for the unconsolidated sand in the formation.

The treating composition useful in the method of the present invention must meet certain specific requirements. The sand component in general should be closely sized in the broad range 12–80 mesh, i.e., 12–20, 20–40, 40–60, or intermediate meshes to permit effective relatively high-permeability cement barriers being formed. In addition, the ratio of the sand component to the cement component should be about 3 parts to about 12 parts by weight of sand per part of cement. It has been found that a frac sand, i.e., a sand customarily used in formation-fracturing operations, having a size of between about 20 and 40 mesh is most suitable for use in the cement slurry of the present invention. It is preferred to use a graded sand with the larger grains being not more than about twice the diameter of the smaller grains, i.e., 12–20 mesh, 20–40 mesh, 40–60 mesh, etc. In general, a 20–40 mesh sand is used because of its ready availability and adaptability for use in stabilizing most formations. In addition, the use of a 20–40 mesh sand appears to prevent premature bridging which is likely to be more prevalent with finer mesh sands. Sand particles which are coarser than about 12 mesh and finer than about 80 mesh are unsuitable for use in the composition of the present invention. The coarser particles are not satisfactory because the resultant set cement barrier has too great a permeability to prevent the flow of very fine unconsolidated sand particles therethru when the well is placed on production. Very fine sand particles, that is those sand particles finer than about 80 mesh, are unsuitable because the resultant set cement has too low a permeability to permit the flow of desired formation fluids therethru.

The cement component of the composition of the present invention should be present in the composition in a ratio of about one part of cement to from 3 to about 12 parts by weight of sand, on a weight basis. The cement component of the composition of the present invention may be any of the cements normally used in oil well cementing operations as well as plaster of paris cement. It is preferred that the cement component be a light weight Portland cement having a density of about 75 pounds per cubic foot and a chemical analysis approximately as follows: silicon dioxide 38.3 percent, aluminum oxide 13.0 percent, ferric oxide 5.2 percent, calcium oxide 35.7 percent, magnesium oxide 1.6 percent, and sulfur trioxide 2.4 percent, with a loss on ignition of approximately 3.3 percent. This particular lightweight Portland cement has been found to be most suitable in the composition of the present invention since permeable cements made from this cement are most stable to attack by formation brines containing sodium chloride or sodium sulfate. Other oil well cements are not as resistant to attack by formation brines or sulfate solutions and therefore are not as practical for use in the cement composition of the present invention. These other cements appear to lose some of their compressive strength and become eroded from contact with sodium chloride and sodium sulfate solutions. In contrast the cements of the composition of the present invention are very resistant to erosion by sodium chloride or sodium sulfate solutions and do not lose their compressive strengths even after prolonged exposure thereto.

The hydrocarbon oil component of the composition should be employed in an amount of from about 0.3 part to about 0.7 part by weight per part by weight of cement. It is preferred that the oil component be employed in an amount of about 0.35 to about 0.45 part by weight per part by weight of cement. Use of the oil component in this amount provides sufficient oil to wet the cement and sand components of the composition and at the same time avoids an excess thereof which might damage the unconsolidated underground formation by the cement component being dispersed from the sand component when the composition is placed adjacent thereto.

Suitable hydrocarbon oils include the kerosene and diesel oil fractions of a petroleum crude oil as well as refined oil fractions and refined motor oils.

A necessary component of the petroleum oil fraction of the composition of the present invention is an oil wetting water repellent agent, i.e., a water-insoluble oleophilic material of relatively high molecular weight which will permit the petroleum fraction to oil wet the surfaces of the sand and cement particles in the treating composition. The oil-wetting agent must contain an oleophilic group and a polar group for preferential adsorption on or at the oil and sand-cement interfaces. Representative oil-wetting agents useful in the practice of the present invention include the relatively high molecular weight amines such as for example, the $C_{10}$–$C_{18}$ hydrocarbylamines, decyl-, dodecyl- and octadecylamine, the $C_{10}$–$C_{18}$ fatty alcohols such as cetyl and octadecyl alcohol, the $C_{10}$–$C_{18}$ alkylated phenols and naphthols, natural fatty material such as lanolin, lard, cottonseed oil and fatty acid glycerides, amides such as the $C_{12}$–$C_{18}$ fatty acid amides, and mixtures of these oil wetting agents.

The oil-wetting agent is used in an amount of from about 1 to about 10 percent by weight, based on the weight of the cement particles in the treating compositions.

It has been found that a preferred procedure is to first dissolve the oil wetting agent in a solvent such as isopropyl alcohol, before mixing with the oil component to facilitate mixing of these components.

The conditioned aqueous carrier medium hereinafter described, containing the suspended oil wet sand and cement solids is pumped down the well bore and into the formation to be consolidated at a rate of from about 1 to 4 barrels of the suspended solids in the carrier medium per minute. Such pumping rates have been found to give the most satisfactory results in the practice of the invention.

An aqueous surface active agent solution contacts the emplaced oil-wetted sand-cement particles to displace the oil therefrom and to initiate hardening of the cement. The surface active agent used must be a water soluble material to penetrate the oil-sand-cement interface and water wet the cement particles and remove the oil therefrom. Representative surface active agents that will perform satisfactorily in the present invention include anionic, cationic and nonionic materials such as the alkyl, aryl or alkaryl sulfates and sulfonates, the sulfated and sulfonated alkyloxyated amides, esters or ethers, hydrocarbylamine salts, esters or ether-esters of natural fats and oils, or alkyl phenols. The surface-active agents include polyoxyethylene sorbitan monolaurate, monopalmitate, and -monooleate, oxyalkylated amyl phenol, alkaryl polyether alcohols and polyoxyethylene ether. A preferred surface active agent is an ethoxylated nonylphenol containing about 9.5 moles of ethylene oxide, known by the trade name "Surfonic N-95."

The aqueous carrier medium in which the treating composition is suspended must meet certain additional requirements, among which are its compatibility with the treating composition as well as with the formation to be treated. Heretofore, it has been found necessary to employ fresh water or synthetic brine water as the aqueous carrier medium for the treating composition because of the incompatibility of many produced "field waters" therewith. It has been found in practice that use of an untreated field water brings about erratic results in the permeable cement placed in the formation.

As used in this specification and claims, the expression "field water" is meant to include a produced-, sea-, bay-, or canal-, water including mixtures thereof, obtained in or near oil producing formations which may serve as the carrier medium for the treating composition.

The incompatibility problem arising from the use of untreated field waters as the aqueous carrier medium for the treating composition is due to the presence therein of one or more unidentified cement dispersing materials that have a deleterious effect on the cement component of the treating composition. The presence of the deleterious materials in the field water being used as the carrier medium for the treating composition composed of sand-cement-hydrocarbon oil and oil wetting agent cause some of the cement particles to separate from the remaining components of the treating composition and become dispersed in the carrier medium. Separation of these cement particles is objectionable for they tend to plug the formation and/or reduce the compressive strength of the permeable cement barrier to be formed from the treating composition.

It has now been found that an untreated field water containing a cement dispersing agent, as determined by the hereinafter described Test Procedure, can be conditioned in most instances to render it suitable for use as the carrier medium for the treating composition whereby plugging the formation and/or reducing the compressive strength of the resulting formed cement barrier is avoided.

The conditioning treatment consists in adding to a field water which has been tested and found to contain cement dispersing materials calcium oxide or calcium hydroxide or a mixture thereof in an amount sufficient to increase the pH of the water to a value in the range of from about 8 to about 10, preferably between about 8.5 to 9.2 with agitation such as by mechanical stirring to insure thorough mixing to aid in precipitating any formed insoluble substances from the agitated water, and thereafter filtering the treated, agitated field water to remove the formed insoluble substances. Optionally, if the field water to be treated contains large amounts of suspended solids, the water should be first filtered before treatment.

The resulting conditioned field water is then in satisfactory condition for use as the carrier medium for the treating composition.

This combination treatment has been found effective in removing the cement-dispersing materials from a field water heretofore considered unsatisfactory for use as the carrier medium.

TEST PROCEDURE

The field water sample is first filtered through a Pall 3 micron filter element using a Masterflex variable speed tubing pump. An Osterizer blender, modified by wrapping the glass container thereof with a heating tape, is filled with 3 cups (710 ml.) of the filtered field water and stirring begun at the lowest speed. Approximately 160 grams of the treating composition (equivalent of 2 pounds/gal. loading) is then added and heating is started. As the water temperature reaches the 100, 120, and the 140°F. values for the heated field water, 50 ml. aliquots are separately removed and each is filtered by passage through Whatman No. 42 filter paper. The residue remaining on the filter is washed with chlorothene and with acetone, then the filter is dried. The amount of cement residue on the filter paper is visually evaluated at each test temperature and graded as follows:

Slight - Very little cement on the filter paper (approx. up to 30–40 mg. of dispersed material).

Moderate - Intermediate between slight and heavy (approx. 40–100 mgs.).

Heavy - Fairly uniform layer (over 100 mgs.).

Any field water assigned a moderate or heavy rating in the test temperature ranges is classified as an unsatisfactory field water and must be conditioned before use as the aqueous carrier fluid.

Following is a description by way of example of a method for carrying out the present invention.

EXAMPLE

A. A produced brine having the following analysis, ppm, Na-17,940, Ca-1,160, Mg-220, Ba-0, Cl-30,350, $SO_4$-40, $CO_3$-0, $HCO_3$-280, Fe-70, $CO_2$-31, pH 6.5, S.G. 1.03, Turbidity 75 (estimated) and a Total Dissolved Solids Content of 49,990, was subjected to the above described test procedure. At test temperatures of 100° and 120°F., very slight cement dispersions were found, but at 140°F., the cement dispersion was moderate. The latter test indicates that this water would be unsatisfactory for use as the carrier fluid medium.

B. Another sample of this water was treated in accordance with the method of the invention and retested at the 140°F. temperature. The test results showed only slight dispersion for this treated water, indicating it was satisfactory for use as a carrier fluid medium.

C. Another produced brine from a field in Louisiana was tested to determine its dispersing properties. At 100°F. it was found to give only slight dispersion but at 120° and at 140°F., it was found to be unsatisfactory, for at these temperatures the degree of dispersion was moderate and heavy, respectively.

D. Another sample of this brine, treated in accordance with the invention was found satisfactory at 120°F. and at 140°F. the cement dispersion was decreased by over 50 percent, exhibiting a very moderate amount of dispersion. While this 140°F. temperature result would probably mitigate against use of this treated brine as the carrier medium at temperatures downhole in the 130°-140°F., nevertheless it would be satisfactory for use at temperatures not above 120°F.

FIELD TEST

A field test of the method of the invention was carried out at a well in the Port Neches Field, Texas.

A canal water which had shown "moderate dispersion" in the heretofore described test procedure at temperatures up to 140°F., and was therefore considered unsatisfactory for use as the carrier medium, was conditioned in accordance with the practice of the invention.

The canal water was treated with hydrated lime in an amount of 50 pounds thereof for the 200 barrels of canal water, with mixing, then filtered to remove precipitated solids. The pH of the treated water was about 9. The treated canal water, to which 10 percent by weight of sodium chloride had been added to minimize any dispersion caused by the presence of any surface active agents such as naphthenic acids in the hydrocarbon oil component of the treating composition, was used as the aqueous carrier medium for the sand-cement-hydrocarbon oil-oil wetting agent treating composition.

The well had been shut in for about 1.5 years prior to treatment. In the present workover operation, the perforations in the 4.5 inch casing (4 shots per foot) at the 6,680–6,688 ft. depth were washed with salt water followed by conventional mud acid using a (Retrievable Test-Treat-Squeeze (RTTS) Packer). After the circulation of the wash liquid and acid and removal, the packer was moved above the upper perforation and set. The treating composition suspended in the conditioned canal water in an amount of 0.8 pound per gallon of the carrier medium was pumped into the formation at a rate of about 3 barrels per minute. Two stages were performed with a good screen-out being obtained on each. It was found that in all, 16 cubic feet of the treating composition has been squeezed out of the perforations. After placement, the composition was contacted with an aqueous curing solution comprising 10 percent by weight of caustic, 10 volume percent of isopropanol and 1 percent of a water soluble surface active agent by the trade name "Surfonic N-95," an ethylene oxide adduct of nonyl phenol containing an average of about 9.5 ethylene oxide groups.

After a curing period the well was placed on production. It produced no substantial quantities of oil but produced up to about 156 barrels per day of salt water with no sand.

We claim:

1. In a method of treating an oil-containing incompetent formation penetrated by a wellbore to prevent the movement of unconsolidated sand particles from said formation to the wellbore as the oil is recovered from said formation, wherein a treating composition is formed consisting essentially of sand, cement and a sufficient amount of a petroleum oil containing an oil wetting agent therein to oil wet the sand and cement particles, said treating composition is suspended in an aqueous carrier medium, the resulting aqueous suspension is injected at a pressure sufficient to force the treating composition into said unconsolidated formation, and wherein the placed treating composition is contacted with an aqueous surface active agent solution to water-wet the cement particles thereof and to effect setting of the cement to form a permeable cement barrier through which oil is recovered, the improvement which comprises conditioning a field water containing a cement dispersing agent therein prior to use of the conditioned field water as the aqueous carrier medium for said treating composition, said conditioning comprising contacting the field water with a calcium compound selected from the group consisting of calcium oxide, calcium hydroxide and mixtures thereof in an amount sufficient to raise the pH of the field water to a pH value between about 8.5 and 10, with stirring, and thereafter filtering said alkaline treated field water to remove the precipitated cement dispersing agent therefrom.

2. Method as claimed in claim 1 wherein said field water is a produced oil field brine containing a cement dispersing agent therein.

3. Method as claimed in claim 1 wherein said field water is sea water containing a cement dispersing agent therein.

4. Method as claimed in claim 1 wherein said field water is bay water containing a cement dispersing agent therein.

5. Method as claimed in claim 1 wherein said field water is canal water containing a cement dispersing agent therein.

6. Method as claimed in claim 1 wherein said field water is a synthetic field brine water containing a cement dispersing agent therein.

7. Method as claimed in claim 1 wherein the alkaline agent is calcium oxide.

8. Method as claimed in claim 1 wherein the alkaline agent is calcium hydroxide.

9. Method as claimed in claim 1 wherein said pH is in the range of from about 8.8 to about 9.2.

10. Method as claimed in claim 1 wherein said treating composition is suspended in an amount of from about 1 to 5 pounds thereof per gallon of said conditioned carrier medium.

* * * * *